Dec. 15, 1970  K. D. FROOME ET AL  3,547,539
DISTANCE MEASUREMENT
Filed Nov. 24, 1967  3 Sheets-Sheet 2
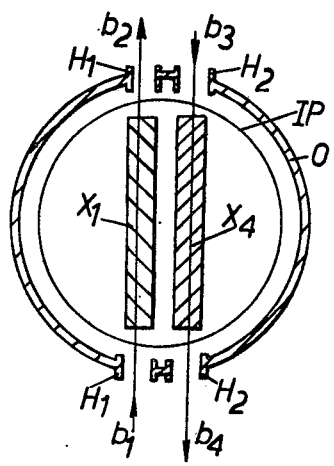
FIG.1a.
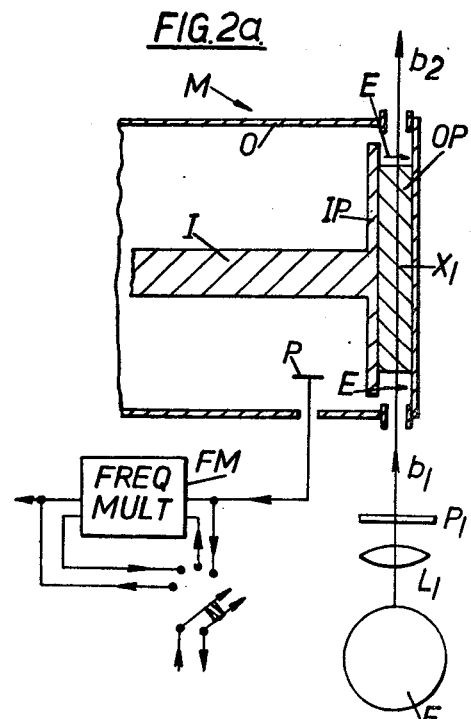
FIG.2a.
FIG.3.
MEKOMETER III DATA REDUCTION SHEET (Ft)
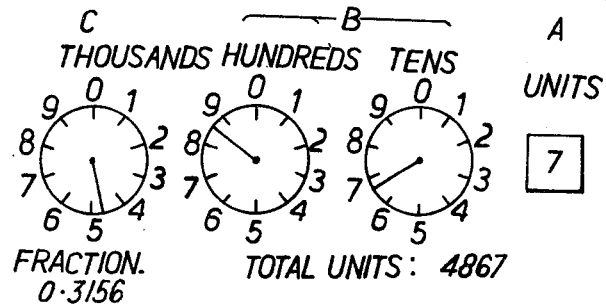
FRACTION. 0·3156  TOTAL UNITS: 4867
D = 4867 .3156 FT
REFLECTOR = 0 : FT
ELEVATION OF TOTAL CORRECTIONS = 0 : FT
TARGET: 0°0'
RESULT  4867 ·3156 FT
CORRECTIONS:  DATE: 15/9/66
  ALTITUDE : 0
  SLOPE : 0
           0
REMARKS :

United States Patent Office 3,547,539
Patented Dec. 15, 1970

3,547,539
DISTANCE MEASUREMENT
Keith Davy Froome and Robert Howard Bradsell, Teddington, England, assignors to National Research Development Corporation, London, England, a British corporation
Filed Nov. 24, 1967, Ser. No. 685,414
Claims priority, application Great Britain, Dec. 1, 1966, 53,926/66
Int. Cl. G01c 3/08
U.S. Cl. 356—5
21 Claims

ABSTRACT OF THE DISCLOSURE

A distance measuring apparatus comprises a modulation oscillator for modulating light; a flash tube light source; a photomultiplier for indicating a given value of the modulation phase of the modulated light received at a given point after traversal of the path relative to that of the light; a variable light path device adapted to form part of the path taken by the light; and a tuner for tuning the modulated oscillator to a first wavelength and a plurality of further wavelengths in succession. Each of these wavelengths is monitored or controlled by a single standard cavity resonator through the intermediary of a selected frequency multiplier, and the relative magnitudes of said wavelengths are so chosen that the magnitudes of the successive adjustments of the variable path device necessary for the given value of the relative modulation phase to be indicated after tuning the oscillator to each successive further wavelength are indicative of successive orders of magnitude in the length of said path.

---

This invention relates to distance measuring apparatus and comprises improvements in or relating to distance measurement.

According to the present invention in one aspect thereof there is provided a method of distance measurement comprising modulating an electromagnetic carrier radiation with a cyclical modulating signal, transmitting the modulated beam over a path to be measured, causing interference at a given point between the modulation of the returning radiation and the modulating signal, or a signal in known phase relation thereto, and indicating a given value of the modulation phase of the returning radiation relative to the modulating signal, changing the modulation wavelength from a first wavelength to a plurality of further wavelengths in succession and measuring at each successive further wavelength the respective adjustment necessary in the total path travelled by the modulated radiation to cause said given value of the relative modulation phase to be indicated, the said successive wavelengths being so chosen in relation to each other that said respective adjustments are indicative of respective orders of magnitude in the distance to be measured.

Additionally, the invention provides distance measuring apparatus comprising a modulation oscillator for modulating an electromagnetic carrier radiation, means for transmitting the modulated radiation over a path the length of which is to be measured, means for indicating a given value of the modulation phase of said radiation received at a given point after traversal of the said path relative to that of the radiation, a variable path device adapted to form part of the path taken by the modulated radiation, and tuning means for tuning the modulation oscillator to a first wavelength and a plurality of further wavelengths in succession, each said wavelength being monitored or controlled by a single standard cavity resonator through the intermediary of a selected frequency multiplier, and the relative magnitudes of said wavelengths being so chosen that the magnitudes of the successive adjustments of the variable path device necessary for said given value of the relative modulation phase to be indicated after tuning the oscillator to each successive further wavelength are indicative of successive orders of magnitude in the length of said path.

Adjustment means are preferably provided for changing the modulation wavelength of said oscillator within a limited range, and means for indicating to a first approximation the length of said path as a direct indication of the adjustment effected by said adjustment means in changing the modulation wavelength so as to cause the relative modulation phase of the received radiation to undergo one complete cycle of change.

In a preferred arrangement the said given value of the relative modulation phase is arranged to be zero by adjusting, by a measured amount, the variable path device while the oscillator is tuned to the first said modulating wavelength. The respective ratio of the difference between the first and each respective further wavelength to the said further wavelength is preferably arranged to be a respective integer ratio. More particularly, the use of the apparatus is simplified if the said integer ratios in respect of successive further wavelengths are successive multiples of ten.

The distance to be measured may be found accurately using the present invention without the necessity of counting cycles of variation of the relative modulation phase as the modulating wavelength is changed.

In a preferred embodiment of the apparatus two said frequency multipliers are provided and are adapted to cause resonance of the standard cavity resonator when the modulation oscillator is tuned to the first wavelength and the first one of said further wavelengths respectively. The remainder of the said further wavelengths is preferably monitored by the single standard cavity resonator by the mixing, before or after frequency multiplication, of a respective local oscillator signal with the monitored modulation signal, the frequency of each respective local oscillator being selected so that a sideband of the resultant signal corresponds to a resonance of the standard cavity resonator when the modulation oscillator is providing the respective further modulation wavelength.

Preferably a resonance indicator is coupled to the standard cavity resonator to indicate resonance therein and thereby indicate the tuning of the modulation oscillator to each respective wavelength.

The variable path device preferably comprises a linearly movable reflector element to which is attached a direct-reading vernier scale. In addition, two or more indicating pointers may be geared to the variable path device and adapted to rotate over respective scales on adjustment of the variable path device, the scales being calibrated to indicate the successive orders of magnitude in the distance when the successive adjustments of the variable path device are made at respective successive modulating wavelengths.

The means for changing the wavelength of the modulation oscillator preferably comprises a fine tuning member movable independently of the said tuning means selectively into and out of the cavity resonator by means of a rotatable cam which is drivingly connected to an indicator calibrated in terms of distance to said first approximation.

The standard cavity resonator may be filled with air or gas at substantially the same temperature and pressure as the ambient temperature and pressure along the said path.

The modulating wavelengths may be in the radio-frequency region and means are provided for drying the air or gas in the standard cavity resonator.

In a further aspect the present invention provides apparatus for use in distance measuring equipment comprising a cavity resonator, an oscillator for maintaining a modulating electromagnetic oscillation in the resonator at a predetermined wavelength, and two crystals which exhibit the direct Pockels linear electro-optic effect and which are respectively arranged in the cavity resonator or in respective synchronized resonators for the transmission therethrough in a direction parallel to their $z$-axes of the outgoing and returning beam respectively, the $x$- or $y$-axis of each crystal being parallel to the plane of polarisation of the respective beam passing therethrough. the apparatus further including means for changing the modulation wavelength and/or total path traversed by the beam between its passage through the two crystals so as to permit measurement of the path in terms of the modulation wavelength.

The $x$-axes of the said two crystals are preferably perpendicular to each other.

The $z$-axis of each crystal is preferably parallel to the electric field at the respective crystal.

Preferably two respective further crystals, substantially identical with the first two crystals, are arranged with their $z$-axes aligned with the $z$-axes of the respective first two crystals in respective regions where the electric field in the resonator or the respective resonator is in the direction of the respective $z$-axes and is oppositely directed to that in which the first two crystals are disposed, whereby the outgoing and returning beams each pass in succession through a respective first and a respective further crystal, the $x$-axis of each further crystal being perpendicular to the $x$-axis of the adjacent first crystal.

In a preferred construction the cavity resonator comprises substantially cylindrical coaxial inner and outer conductors, the said crystals extending with their $z$-axes substantially radially disposed across the annular space between the two conductors.

Each respective further crystal is preferably disposed on the diametrically opposite side of the inner conductor from the respective first crystal. Thus in a preferred construction the crystals are mounted in a common cavity resonator the inner and outer conductors of which have two sets of aligned apertures therein through which the outgoing and returning beams respectively may pass in respective substantially diametrically extending paths.

The invention will now be described, by way of example only, with reference to the accompanying drawings, in which:

FIGS. 1a and 2a are diagrammatic sectional views through part only of an alternative embodiment of the invention, and correspond to FIGS. 1 and 2 respectively, FIG. 1a being a section on $b_1$–$b_2$ in FIG. 2a; and FIG. 3 illustrates diagrammatically one form of data reduction sheet for use with the distance measuring apparatus.

Figure 1:
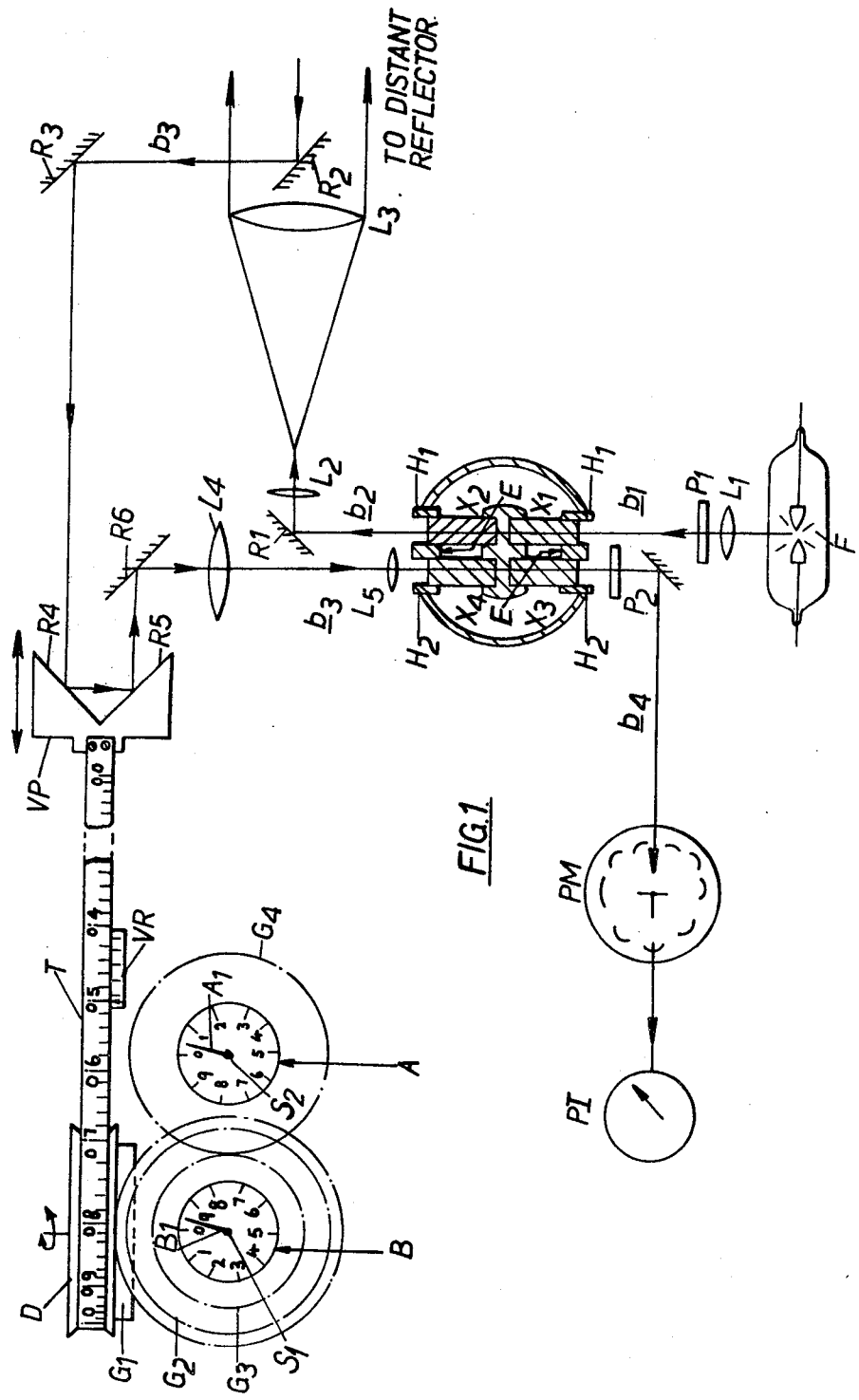
FIG. 1 illustrates diagrammatically part of a distance measuring apparatus according to a preferred embodiment of the present invention.

Referring to FIG. 1, a flash tube light source F provides a light beam $b_1$ which is directed by a short focus lens $L_1$ (focal length 1½ inches) through a plane polariser $P_1$; The plane polarised light from the polariser $P_1$ is directed through a first set of aligned holes $H_1$ in a modulating cavity M. The modulating cavity M is arranged, in a manner to be described, to produce polarisation modulation of an outgoing beam $b_2$.

The polarisation modulated beam $b_2$ is deflected by a reflector $R_1$ through a short focus lens $L_2$ (focal length 1 inch) and an objective lens $L_3$ (focal length 8 inches; diameter 2½ inches) in succession. The objective lens $L_3$ serves to transmit the outgoing beam $b_2$ of about 1.5 milliradians diameter along a path the length of which is to be measured. A reflector (not shown) such as a "cat's eye" or cube-corner device is located at the far end of the path to be measured and arranged to reflect the modulated light beam and direct the returning beam $b_3$ back towards the objective lens $L_3$. The returning beam $b_3$ is diverted by inclined reflectors $R_2$, $R_3$ into a variable light path device VP.

The variable light path device VP may be of any convenient known construction and in the example illustrated comprises two reflectors $R_4$, $R_5$ arranged at right angles to each other and each inclined at 45° to the incident returning beam $b_3$. The light path device VP is mounted for linear movement in the direction of the beam $b_3$ by means of a screw adjustment (not shown). Attached to the variable light path device VP is a steel tape T which is calibrated in fractions of a foot and which has a vernier reading scale VR. As the light path device VP is moved linearly the tape T is wound onto or unwound from a rotatable drum D.

The drum D carries a gear wheel $G_1$ which meshes with a bevel gear $G_2$ (shown in broken lines). The gear wheel $G_2$ is mounted on a first rotating shaft $S_1$ on which a first pointer $B_1$ is loosely mounted, but with which the pointer $B_1$ is frictionally engaged. The pointer $B_1$ moves over a first fixed circular scale B. The shaft $S_1$ also carries a further gear $G_3$ which meshes with a fourth gear wheel $G_4$. The gear wheel $G_4$ is mounted on a shaft $S_2$ which carries a second pointer $A_1$, also in frictional engagement therewith. The pointer $P_2$ moves over a second fixed circular scale A. The calibration and function of the scales A, B will be described hereinafter.

After passing through the variable light path device VP, the returning beam $b_3$ is deflected by a reflector $R_6$ through a receiving objective lens $L_4$ (focal length 8 inches; diameter 1½ inches) and a short focus lens $L_5$ (focal length 1 inch) through a second set of aligned holes $H_2$ in the modulating cavity M. After passing through the modulating cavity M for the second time the emergent beam $b_4$ passes through an analyser $P_2$ which is crossed with respective polariser $P_1$ and thence by way of a reflector $R_7$ into a photomultiplier PM.

The modulating cavity M comprises (FIG. 2) a quarter-wave coaxial line cavity resonator having an output substantially cylindrical conductor O and an inner coaxial conductor I. The cavity M constitutes the resonator of a triode valve modulation oscillator indicated diagrammatically at V. The cavity M may be excited into strong oscillations for a duration of 40 $\mu$s. by using a valve of the disc-sealed triode type. A limited range of tuning of the modulation wavelength of the cavity M is provided by means of an axially movable annular tuning member TM of insulating material which is disposed in the annular space between the inner and outer conductors I, O.

The two sets of aligned holes $H_1$, $H_2$ are provided in the inner and outer conductors I, O adjacent one end of the inner conductor I, and are disposed in a common cross-sectional plane of the cavity M, as shown in FIG. 1. The common axes of the respective sets of holes $H_1$, $H_2$ extend parallel to one another and substantially diametrically of the cylindrical outer conductor O.

Polarisation modulation of the beam $b_1$ is achieved by means of crystals, for example of potassium dihydrogen phosphate (KDP), which display the direct Pockels linear electro-optic effect. In the embodiment illustrated in FIGS. 1 and 2 four substantially identical KDP crystals are mounted in the modulating cavity M. A first pair of crystals $X_1$, $X_2$ are disposed in the aligned holes $H_1$ with their $z$-axes aligned with each other and extending in the direction of the aligned holes $H_1$, that is, in the direction of the incident beam $b_1$. The crystal $X_1$ is arranged with its $x$-axis parallel to the plane of polarisation of the incident beam $b_1$, while crystal $X_2$ is arranged with its $x$-axis perpendicular to the $x$-axis of the crystal $X_1$. It will be apparent from the geometry of the modulating cavity M that crystals $X_1$ and $X_2$ are arranged with their $z$-axes aligned in the direction of the oscillating electric fields E within the cavity at these respective crystals, said electric fields being in opposite directions at the crystals $X_1$ and $X_2$, as indicated.

Two crystals $X_3$ and $X_4$ are similarly arranged in the aligned holes $H_2$. Thus crystals $X_3$ and $X_4$ have their z-axes aligned with each other and with the axis of the aligned holes $H_2$, that is, in the direction of the returning beam $b_3$. The x-axis of crystal $X_4$ is parallel to that of crystal $X_1$, while the x-axis of crystal $X_3$ is perpendicular to that of crystal $X_1$.

The dimensions of the crystals $X_1$–$X_4$ are small compared with the modulation wavelength in the cavity M. Thus in a specific example each crystal $X_1$–$X_4$ is 0.5 inch long by 0.2 inch in diameter, the modulation wavelength being 2 feet.

The electric field E acting on each of the crystals $X_1$–$X_4$ induces elliptical polarisation of the beam passing therethrough by the Pockels effect. The ellipticity induced is linearly dependent on the magnitude of the applied electric field E. Thus the beam $b_2$ emerging from the crystals $X_1$, $X_2$ is polarisation-modulated with a modulation wavelength dependent on the wavelength of the oscillations of the electric field in the modulating cavity M.

The employment of two orthogonally arranged crystals $X_1$, $X_2$ in series in regions where the applied electric field E is oppositely directed enables a "voltage doubling" effect to be obtained, and the depth of polarisation modulation of the beam passing through the two crystals is therefore double that which would be obtained using a single crystal only.

When, after traversing the distance to be measured and the variable light path VP, the returning beam $b_3$ passes through the crystals $X_4$, $X_3$ in aligned holes, $H_2$, the ellipticity of the elliptical polarisation of the beam $b_3$ will in general either be increased or decreased depending on the relative modulation phase of the returning beam $b_3$ compared with the instantaneous phase of the oscillations in the modulating cavtiy M. Thus the emergent beam $b_4$ entering the analyser $P_2$ will, in general, have its plane of polarisation in a different plane from that of the original beam $b_1$, and the amount of light passed by the analyser $P_2$ will therefore, be dependent on the said relative modulation phase of the outgoing and returning beams $b_2$, $b_3$ at the modulating cavity M. As the light path is varied in the variable light path device VP the relative modulation phase will pass through successive complete cycles, and these will be detected in the photomultiplier PM by successive cycling between a minimum and maximum detected output. An indicator PI connected to the photomultiplier PM will therefore be capable of providing an indication of a particular value of the relative modulation phase; in this case the relative modulation phase will be zero when the photomultiplier indicator PI indicates a minimum.

The modulation wavelength may be varied by the tuning member TM which preferably produces a frequency shift of 11% and successive predetermined values of the wavelength are monitored by a single cavity resonator SR (FIG. 2) having an energising input line J which is connected to a pick-up probe P in one end of the modulating cavity M and which includes a frequency multiplier FM. By changing the multiplication ratio of the frequency multiplier FM from a first to a second value, using a manual control switch (not shown), the standard cavity resonator SR may be made to resonate with the signals picked up from the modulating cavity M at two respective modulation wavelengths. Resonance in the standard cavity resonator SR is detected by a resonance indicator RI connected thereto.

The frequency multiplier FM is of the step recovery diode ("snap" diode) type and in the specific example illustrated it is arranged to multiply the modulation frequency of the oscillations in the modulating cavity M by either 9 or 10.

The standard cavity resonator SR comprises a halfwave ($\lambda/2$) line comprising a cylindrical copper or plated fused quartz outer conductor SO and a gold plated fused quartz (or silica) inner conductor SI. By suitably choosing the relative dimensions of the outer and inner conductors SI, SO, it is possible to arrange that the standard resonator SR has zero temperature coefficient in vacuo.

The cavity of the standard resonator SR is filled with dry air at substantially the same temperature and pressure as the ambient temperature and pressure along the path to be measured. Thus a chamber containing a drying agent DR communicates with the resonator cavity, the chamber terminating in a soft bellows device PE which ensures equalisation of the pressure internally and externally of the standard resonator SR.

As has been shown in U.S. patent application Ser. No. 409,884, now Pat. No. 3,480,854, the use of a standard cavity resonator SR containing dry air under ambient conditions to monitor the modulation wavelength results in the modulation wavelength being substantially independent of the refractive index along the path to be measured, and dependent solely on the dimensions of the standard resonator SR.

The use of a frequency multiplier FM having two different multiplication ratios enables the single standard cavity resonator SR to be used for monitoring two modulation wavelengths. A further advantage of providing the frequency multiplier FM between the modulating cavity M and the standard cavity resonator SR is that, for a given modulation wavelength the physical dimensions of the standard cavity resonator SR are small compared with the wavelength, enabling the resonator SR to be constructed with a high Q-factor.

Figure 2:
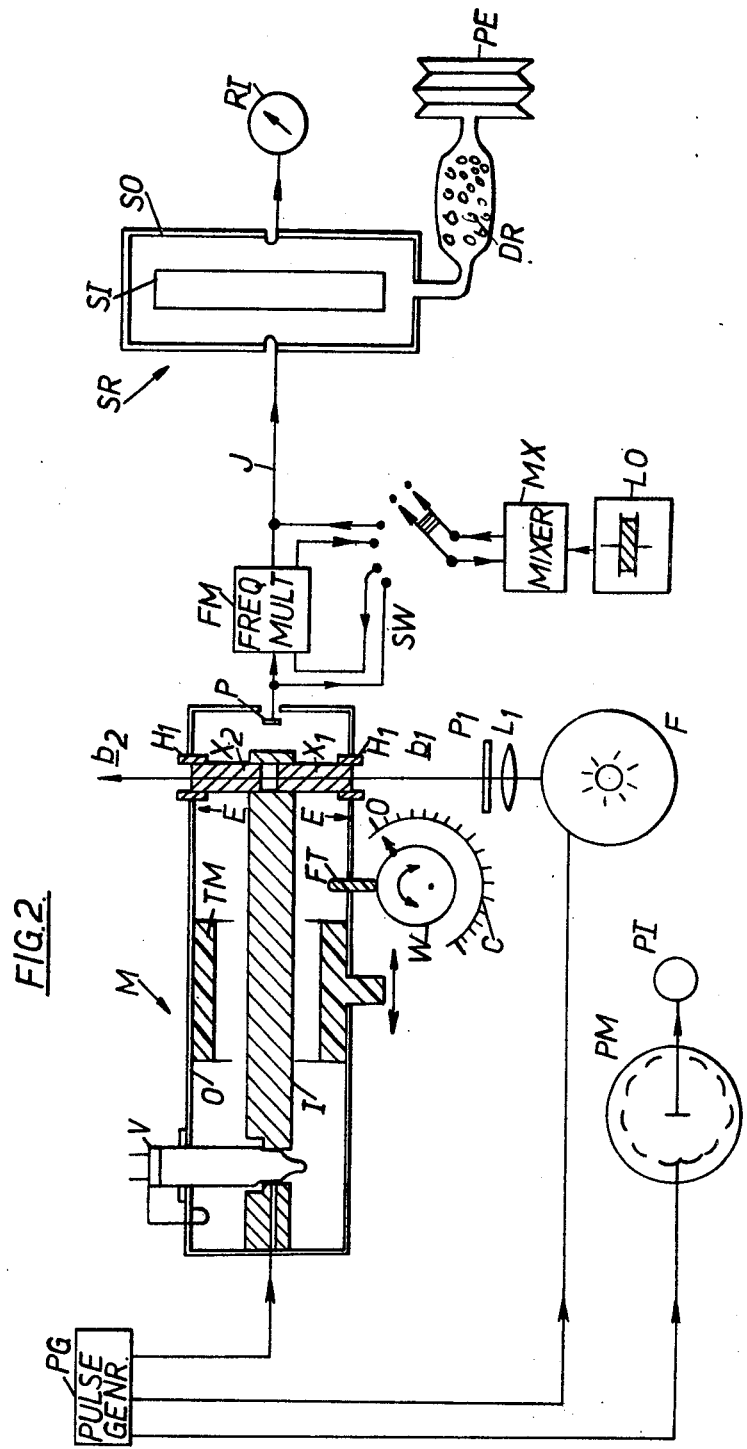
FIG. 2 is a diagrammatic section through part of the apparatus shown in FIG. 1.

For providing further variation in the modulation wavelengths which may be monitored by the single standard resonant cavity SR a number of quartz crystal local oscillators LO (one only of which is shown in FIG. 2) are provided and connected to the standard cavity input line J through a mixer MX and a switch device SW. The switch device SW injects the output of the mixer MX into the input line J of the standard cavity resonator SR either before or after the frequency multiplier FM, and has a further setting in which the mixer MX is not connected to the input line J.

The principle of operation of the apparatus is similar to that described by the inventors in The Journal of Scientific Instruments, vol. 43, pp. 129–133 (March 1966), and disclosed in patent application No. 409,884. The distance D from the modulating cavity M to the reflector at the far end of the path to be measured may be expressed in terms of the modulation wavelength $\lambda$ as follows:

$$D = \tfrac{1}{2}\lambda(N+\delta+p) \qquad (1)$$

where

N is the integer number of half-wavelengths in the distance D, $\delta$ is the "fractional excess" of D above this integer number of half waves, and p is a phase factor depending on the nature of the demodulation or detection effected at the modulating cavity M.

As stated above, the phase factor p is zero, thereby simplifying Equation 1, when the crystals $X_1$ and $X_2$ used for modulation are arranged, as in the present case, with their x-axes perpendicular to the x-axes of crystals $X_3$ and $X_4$ respectively as described above, the x-axes of crystals $X_1$, $X_2$ being perpendicular to each other, as stated above.

If the modulation wavelength is varied between two values $\lambda_1$ and $\lambda_2$, at which the corresponding values of N and $\delta$ are $N_1$, $\delta_1$ and $N_2$, $\delta_2$ respectively, then $$D = \tfrac{1}{2}\lambda_1(N_1+\delta_1) \qquad (2)$$
$$D = \tfrac{1}{2}\lambda_2(N_2+\delta_2) \qquad (3)$$

From Equations 2 and 3 it follows that $$N_1 = \frac{\lambda_2}{\lambda_2 - \lambda_1}\left\{n + (\delta_1 - \delta_2)\right\} - \delta_1 \qquad (4)$$

where $n = N_1 - N_2$.

When using the apparatus, the fractional excess $\delta_1$ at the first modulation wavelength $\lambda_1$ is conveniently reduced to zero by making an initial adjustment of the variable light path VP and measuring the adjustment so made on the steel tape T and vernier V. This initial adjustment is recorded and will form part of the final accurate distance measurement made by the apparatus, as described below. Thus putting $\delta_1 = 0$ in Equation 4:

$$N_1 = nR - R\delta_2 \qquad (5)$$

where R is defined as the ratio $\lambda_2/(\lambda_2 - \lambda_1)$.

In the said earlier apparatus the distance D was determined by measuring $\lambda_2$ on a variable path device and evaluating the integer $n$ by counting the number of complete cycles effected by the output of the phase detecting means (that is, the photomultiplier PM in this example) when the modulating wavelength is changed from $\lambda_1$ to $\lambda_2$. In the present invention the modulating wavelength is changed from the first value $\lambda_1$ to a number of further wavelengths $\lambda_2, \lambda_3 \ldots$ in succession, a measured adjustment $\delta_2, \delta_3 \ldots$ being made in the variable light path device VP after each wavelength change so as to bring the indicated phase difference to zero. As will be illustrated by the following example, the relative values of the wavelengths $\lambda_1, \lambda_2, \lambda_3 \ldots$ can be so chosen that the successive adjustments $\delta_2, \delta_3 \ldots$ give successive orders of magnitude in the distance D to be measured, without having to evaluate $n$.

For convenience of measurement, it is clearly preferable that the ratio R be an integral number, and the two wavelenths $\lambda_1, \lambda_2$ are selected so as to make this so.

The deduction of the distance to be measured from Equation 5 is simplified greatly if an initial modulation wavelength $\lambda_1$ of 2 feet exactly is chosen, so that $\lambda_1/2 = 1$ foot exactly. The corresponding modulation frequency in the modulating cavity M is approximately 492 mHz. and, assuming that for the first modulation wavelength $\lambda_1$ the frequency multiplier FM is operated with a multiplication ratio of 9, the accurate wavelength of the standard cavity resonator SR must be $\frac{2}{9}$ foot, corresponding to a standard cavity resonant frequency of approximately 4428 mHz.

The illustrated apparatus is designed to measure distances of up to 10,000 feet, and the frequency multiplier FM and local oscillators LO are so arranged that the modulation wavelength may change from a first value $\lambda_1$ to a number of successive wavelengths $\lambda_2, \lambda_3, \lambda_4 \ldots$ such that the ratio R of each respective further wavelength is, for the successive wavelengths, equal to 10, 100, 1000 respectively; that is, R increases in multiples of 10 for successive modulating wavelengths. In this way the value of the fractional excess $\delta$ associated with each wavelength, as determined by the adjustment of the variable light path VP required in each case to bring the relative modulation phase back to zero (as indicated by a minimum on the photomultiplier indicator PI) will represent successive orders of magnitude in the distance to be measured.

None of these successive measurements will, however, be capable of yielding the integer number N of half-wavelengths in the distance to be measured, since integer $n$ (Equation 5) and, therefore, the order of interference between the outgoing and returning modulation signals at the modulating cavity M, is not known. However, if a further "count-of-one" measurement is made in which it is deliberately arranged that the number $n$ is exactly unity, then the need to know the order of interference N in any of the preceding successive evaluating measurements is obviated. For the purpose of making such a "count-of-one" measurement the modulating cavity M is provided with a fine tuning plunger FT which is movable radially into and out of the annular space between the inner and outer conductors I, O by rotation of a cam wheel W, the periphery of which engages the plunger FT. A pointer attached to the cam wheel W for rotation therewith moves over a scale C. Variation of the position of the fine tuning plunger FT by the cam wheel W will change the modulation wavelength by a small amount, changing the value of the ratio R. It is arranged, by observing the photomultiplier indicator PI for R to be varied in this way so that the relative modulation phase undergoes exactly one complete cycle of change, that is, the indicator PI, starting at zero, makes its first return to the value zero. It is then known that $n = 1$ exactly in Equation 5, and accordingly $N = R$. It is therefore possible to calibrate the scale C in terms of distance directly for a given modulation wavelength. Although the distance will, of course, be given to a first approximation only by the scale C, in this example to the nearest 1,000 feet, it will nevertheless be sufficiently accurate to establish the order of magnitude of the distance, the accurate value of which will have been evaluated by the path adjustments referred to above, without having at any stage to know the order of interference N or the integer $n$.

When using the preferred initial modulation wavelength of 2 feet, with an initial value of R of 10, as described above, the gears $G_2$, $G_3$ and $G_4$ are arranged to be such that the pointer $B_1$ makes one complete revolution when the light path changes by 1 foot, while the pointer $A_1$ makes one complete revolution when the light path changes by $10\%$ foot. The scale B is divided into ten equal divisions, while the scale A is calibrated in steps corresponding to 1 foot.

The method of making a distance measurement using the apparatus will be illustrated by the following specific example, in which, as described above, the standard cavity resonator SR has an accurate wavelength of $\frac{2}{9}$ foot, corresponding to a frequency of 4428 mHz. The evaluation of the distance D is facilitated if the readings taken at different stages of measurement are entered on a data reduction sheet, reproduced for this specific example in FIG. 3:

(1) The modulation wavelength in the modulating cavity M is set to exactly 2 feet by setting the multiplier FM to a multiplying ratio of 9 and by adjusting the tuning member TM until the resonance indicator RI indicates a resonance. At this stage the switch SW is in the isolating position in which the mixer MX is isolated from the circuit. When resonance is indicated the photomultiplier PM will not in general indicate a minimum intensity. The light path device VP is therefore adjusted until a minimum is indicated by the photomultiplier indicator PI, the movement effected in the light path being measured directly in fractions of a foot on the tape T and vernier scale V. This initial adjustment, which corresponds to the "fractional excess" $\delta_1$ in Equation 2 is entered under the column "Fraction" on the data reduction sheet (FIG. 3) and is shown in this example as .3156 foot;

(2) The friction-held pointers $A_1$, $B_2$ on the scale A, B are each set to zero, since with the specific arrangement illustrated the phase difference $p$ is zero, as explained above;

(3) The modulation wavelength is now set to a value $\lambda_2$ exactly equal to $10\% \times \lambda_1$, that is, $2 \times 10\%$ feet. This is done by setting the frequency multiplier FM to a multiplication ratio of 10, so that the modulation frequency in the modulating cavity M will be $(492 \times 9/10) = 442.8$ mHz. when resonance occurs in the standard cavity resonator SR. The tuning member TM is again adjusted until a standard cavity resonance is again indicated on the resonator indicator RI. The modulation wavelength is then exactly $\lambda_2 = (2 \times 10\%)$ feet, the ratio $R = \lambda_2/(\lambda_2 - \lambda_1)$ for this first measurement being 10 exactly. The variable light path VP is then adjusted, reading the pointer $A_1$ on scale A. Each division on scale A corresponds to 1 foot. The indicated reading on scale A (to the nearest whole number) is therefore entered in the "Units" box on the data reduction sheet, and is in this case indicated as 7.

(4) A second measurement is now made using an integral ratio R of 100 so as to give a variable path reading in units of 10 feet. To do this it is required to produce a modulation wavelength $\lambda_3$ of $^{100}/_{99}\lambda_1 = 2 \times ^{100}/_{99}$ feet. The corresponding modulation frequency will be approximately (492−4.92) mHz., and if the multiplier FM is on the ×9 setting, the output of the frequency multiplier FM will be a frequency of (4428−44.28) mHz. This frequency would not, of course, cause a resonance in the standard cavity resonator SR. In order to provide a resonance in the standard cavity resonator SR for monitoring the modulation wavelength $\lambda_3$, the mixer MX is switched in by the switch SW and used to mix with the output of the frequency multiplier FM a signal from a local oscillator $LO_1$ at a frequency of 44.28 mHz. The upper sideband frequency resulting from the mixing will be a frequency of (4428−44.28+44.28)=4428 mHz., and will, therefore, provide a resonance in the standard cavity resonator SR.

It will be appreciated that the same upper sideband frequency in the frequency multiplier output could be obtained by mixing a local oscillator frequency of 4.92 mHz. with the input to the frequency multiplier FM, using an alternative setting of the switch SW.

With the appropriate local oscillator signal injected, the tuning member TM is again adjusted until a resonance is indicated on the resonance indicator RI, when the modulation wavelength will now be exactly $2 \times ^{100}/_{99}$ feet ($\lambda_3$). The variable light path VP is again adjusted until the photomultiplier indicator PI indicates a minimum when the position of the pointer $B_1$ on the scale B is read. Since gear wheel $G_2$ makes one complete revolution for a light path movement of 1 foot ($\lambda_2$), each of the divisions of scale B for this measurement corresponds to 10 feet. The reading on scale $B_1$ is entered in a "Tens" dial on the data reduction sheet (FIG. 3) which is a replica of the scale B. As shown the "Tens" reading is between 60 and 70.

(5) A measurement is now made with the ratio R equal to 1000, which requires a change in the modulation wavelength to a value $\lambda_4$ equal to $^{1000}/_{999}\lambda_1 = 2 \times ^{1000}/_{999}$ feet. The corresponding modulation frequency is approximately (492−0.492) mHz., and the output frequency of the frequency multiplier FM, when set to a multiplying ratio of 9, will therefore be (4428−44.28) mHz. In order to provide a resonance condition for this modulating wavelength $\lambda_4$ in the standard resonant cavity SR, it is therefore necessary to mix with the output of the frequency multiplier FM a local oscillator $LO_2$ signal of 4.428 mHz. to provide an upper sideband frequency of 4428 mHz. exactly. Alternatively a local oscillator signal of 0.492 mHz. could be mixed with the input to the frequency multiplier FM.

Using this local oscillator frequency, the tuning member TM is again adjusted until resonance is indicated by the resonance indicator RI and the variable light path VP then adjusted once more until the photomultiplier indicator PI indicates a minimum. The reading indicated on the scale B by the pointer $B_1$ will now be in units of 100 feet, and the reading is therefore entered in a "Hundreds" dial on the data reduction sheet. This reading is shown in this example as lying between 800 and 900 feet.

(6) It is finally necessary to determine the order of magnitude of the distance to the nearest 1000 feet, and this is done using the fine tuning plunger FT. The modulating cavity M is again set to produce a modulation wavelength $\lambda_1$ of 2 feet exactly, and the variable light path VP adjusted to a minimum value indicated on the photomultiplier indicator PI. The cam wheel W is then rotated until the photomultiplier indicator PI, having passed through a maximum, reaches the next minimum, and the reading on scale C is then read. The scale C is in this case calibrated from 0 to 10,000 feet in units of 1,000 feet and the reading on the scale C is entered in a "Thousands" dial on the data reduction sheet. This reading is shown as lying, in the illustrated example, between 4,000 and 5,000 feet.

Reading the measurements entered on the data reduction sheet collectively, it is apparent that the distance to be measured D is 4,867.3156 feet. Provision is made on the data reduction sheet for the entering of corrections to the distance D for the position of the reflector (not shown) and the elevation of the reflector relative to the modulating cavity M. These corrections, which would in any event be small, are derived from a correction chart as required.

It should be noted that the local oscillators LO required for providing the appropriate upper sideband frequencies can be quartz crystal controlled oscillators with a stability of only 1 in 10,000, no temperature-controlled oven for the oscillator crystals being required. Since the function of these local oscillators LO is to produce "sidebands" only, any error in the local oscillator frequency contributes little to the required modulation wavelength, of which 99 or 99.9% is still determined by the standard cavity resonator SR. The resultant modulation wavelength is therefore still, for all practical purposes, compensated for atmospheric refractive index.

In a practical embodiment of the apparatus a tuning knob is provided for adjusting the modulation wavelength by moving the tuning member TM. The successive movements of the tuning member TM may be used to switch on the appropriate quartz crystal controlled local oscillators LO through the switch SW, which for this purpose may be coupled to the tuning knob. In addition, mechanical shutters may be coupled to the tuning knob for covering up scale (A, B, C) not appropriate to the modulation wavelength being used on a particular measurement.

As described in pending application No. 409,884, the frequency of the modulating cavity M may be modulated with a small frequency deviation to allow synchronous detection of the phase minimum. In addition, the photomultiplier PM, modulation oscillator valve V and light source F may be pulse-operated from a common pulse generator PG (FIG. 2).

The alternative embodiment shown in FIGS. 1a and 2a employs a modulating cavity M containing two crystals $X_1$, $X_4$ only. The outgoing plane-polarised beam $b_1$ passes through the crystal $X_1$ and the returning beam $b_3$ through the crystal $X_4$. The crystals $X_1$ and $X_4$ are arranged with their z-axes perpendicular to the oscillatory electric field E in the modulating cavity M. Thus the inner conductor I is provided with an end plate IP which is parallel to and spaced from an end wall OP of the outer conductor O, the crystals $X_1$, $X_4$ being located between the end plate IP and end wall OP.

With this embodiment a transverse electro-optic effect in the crystals $X_1$, $X_4$ modifies the polarisation of the respective beams $b_1$, $b_3$ passing therethrough. In this case it is not essential that the z-axes of the crystals $X_1$, $X_4$ be aligned with the directions of the respective beams $b_1$, $b_3$ passing therethrough, although the x-axes of the crystals $X_1$, $X_4$ are arranged perpendicularly to each other to make the phase factor $p$ (Equation 1) zero, as in the embodiment of FIGS. 1 and 2.

The electrical and optical system in the apparatus of FIGS. 1a and 2a is identical with that of FIGS. 1 and 2 and is not, therefore, shown.

In order to accurately locate the minimum output of the photomultiplier M as indicated by the photomultiplier indicator PI a frequency modulating switch (not shown) may be provided in the cavity M. Such a switch introduces a small symmetrical deviation of the modulating frequency between alternate pulses of light and operates the photomultiplier M synchronously so that the minimum output now appears in the indicator PI as a centre-zero null position.

The light source F could be replaced by a laser source.

Although the invention has been described with respect to polarisation modulation of the beam $b_1$ it is obvious that phase modulation of the beam could be effected by replacing the crystals $X_1$, $X_2$, $X_3$ and $X_4$ by crystals which exhibit the Faraday effect thus producing phase rotation at the modulating frequency.

The embodiments of the invention in which an exclusive property or privilege is claimed are defined as follows:

1. A method of distance measurement comprising the steps of modulating an electromagnetic carrier radiation with a cyclical modulating signal, transmitting the modulated beam over a path to be measured, causing interference at a given point between the modulation of the returning radiation and the modulating signal, and indicating a given value of the modulation phase of the returning radiation relative to the modulating signal, changing the modulation wavelength from a first wavelength to a plurality of further wavelengths in succession, monitoring each said wavelength by a standard cavity resonator through the intermediary of a selected frequency multiplier, and measuring at each successive further wavelength the respective adjustment necessary in the total path travelled by the modulated radiation to cause said given value of the relative modulation phase to be indicated, the said successive wavelengths being so chosen in relation to each other that said respective adjustments are indicative of respective orders of magnitude in the distance to be measured.

2. A distance measuring apparatus comprising a modulation oscillator for modulating an electromagnetic carrier radiation, means for transmitting the modulated radiation over a path the length of which is to be measured, means for indicating a given value of the modulation phase of said radiation received at a given point after traversal of the said path relative to that of the radiation, a variable path device adapted to form part of the path taken by the modulated radiation, tuning means for tuning the modulated oscillator to a first wavelength and a plurality of further wavelengths in succession, a single standard cavity resonator for controlling each said wavelength, and a selected frequency multiplier acting as an intermediary for the controlling of the single cavity resonator, the relative magnitudes of said wavelengths being so chosen that the magnitudes of the successive adjustments of the variable path device necessary for said given value of the relative modulation phase to be indicated after tuning the oscillator to each successive further wavelength are indicative of successive orders of magnitude in the length of said path.

3. Apparatus as claimed in claim 2 including adjustment means for changing the modulation of said oscillator within a limited range, and means for indicating to a first approximation the length of said path as a direct indication of the adjustment effected by said adjustment means in changing the modulation wavelength so as to cause the relative modulation phase of the received radiation to undergo one complete cycle of change.

4. Apparatus as claimed in claim 2 in which the said given value of the relative modulation phase is arranged to be zero by adjusting, by a measured amount, the variable path device wihle the oscillator is tuned to the first said modulating wavelength.

5. Apparatus as claimed in claim 2 in which the respective ratio of the different between the first and each respective further wavelength to the said further wavelength is arranged to be a respective integer ratio.

6. Apparatus as claimed in claim 4 in which the said integer ratios in respect of successive further wavelengths are successive multiples of ten.

7. Apparatus as claimed in claim 2 in which two said frequency multipliers are provided and are adapted to cause resonance of the standard cavity resonator when the modulation oscillator is tuned to the first wavelength and the first one of said further wavelengths respectively.

8. Apparatus as claimed in claim 7 in which local oscillators are provided, the said further wavelengths being monitored by the single standard cavity resonator by the mixing, substantially at the stage of frequency multiplication, of the respective local oscillator signal with the monitored modulation signal, the frequency of each respective local oscillator being selected so that a sideband of the resultant signal corresponds to a resonance of the standard cavity resonator when the modulation oscillator is providing the respective further modulation wavelength.

9. Apparatus as claimed in claim 2 in which a resonance indicator is coupled to the standard cavity resonator to indicate resonance therein and thereby indicate the tuning of the modulation oscillator to each respective wavelength.

10. Apparatus as claimed in claim 2 in which a linearly movable reflector element and a direct-reading vernier scale comprise the variable path device.

11. Apparatus as claimed in claim 6 in which at least two indicating pointers may be geared to the variable path device and adapted to rotate over respective scales on adjustment of the variable path device, the scales being calibrated to indicate the successive orders of magnitude in the distance when the successive adjustments of the variable path device are made at respective successive modulating wavelengths.

12. Apparatus as claimed in claim 3 in which a fine tuning member comprises the means for changing the wavelength of the modulation oscillator, said fine tuning member being movable independently of the said tuning means selectively into and out of the cavity resonator by means of a rotatable cam which is drivingly connected to an indicator calibrated in terms of distance to said first approximation.

13. Apparatus as claimed in claim 2 in which the standard cavity resonator is filled with gas at substantially the same temperature and pressure as the ambient temperature and pressure along the said path.

14. Apparatus according to claim 13 in which the modulating wavelengths are in the radio-frequency region and means are provided for drying the gas in the standard cavity resonator.

15. Apparatus for use in distance measuring equipment comprising a cavity resonator, an oscillator for maintaining a modulating electromagnetic oscillation in the resonator at a predetermined wavelength and two crystals which exhibit the direct Pockels linear electrooptic effect and which are respectively arranged in the cavity resonator for the transmission therethrough in a direction parallel to their z-axes of the outgoing and returning beam respectively, the x- or y-axis of each crystal being parallel to the plane of polarisation of the respective beam passing therethrough, the apparatus further including means for changing the modulation wavelength and the total path traversed by the beam between its passage through the two crystals so as to permit measurement of the path in terms of the modulation wavelength.

16. Apparatus as claimed in claim 15 in which the x-axes of the said two crystals are perpendicular to each other.

17. Apparatus as claimed in claim 15 in which the z-axis of each crystal is parallel to the electric field at the respective crystal.

18. Apparatus as claimed in claim 15 in which two respective further crystals, substantially identical with the first two crystals, are arranged with their z-axes aligned with the z-axes of the respective first two crystals in respective regions where the electric field in the resonator or the respective resonator is in the direction of the respective z-axes and is oppositely directed to that in which the first two crystals are disposed, whereby the outgoing and returning beams each pass in succession through a respective first and a respective further crystal, the x-axis of each further crystal being perpendicular to the x-axis of the adjacent first crystal.

19. Apparatus as claimed in claim 15 in which the cavity resonator comprises substantially cylindrical coaxial inner and outer conductors, the said crystals extending with their z-axes substantially radially disposed across the annular space between the two conductors.

20. Apparatus as claimed in claim 18 in which each respective further crystal is preferably disposed on the diametrically opposite side of the inner conductor from the respective first crystal.

21. Apparatus as claimed in claim 18 in which the crystals are mounted in a common cavity resonator the inner and outer conductors of which have two sets of aligned apertures therein through which the outgoing and returning beams respectively may pass in respective substantially diametrically extending paths.

References Cited
UNITED STATES PATENTS

| | | | |
|---|---|---|---|
| 3,200,698 | 8/1965 | Froome | 356—5 |
| 2,966,090 | 12/1960 | Scholdstrom | 356—5 |

OTHER REFERENCES

Lambert: The Geodimeter and Its Uses, The Australian Surveyor, December 1956.

RICHARD A. FARLEY, Primary Examiner

J. G. BAXTER, Assistant Examiner

U.S. Cl. X.R.

343—14